A. L. BOWER.
AUTOMATIC TRAIN CONTROLLING DEVICE.
APPLICATION FILED MAR. 17, 1914.
1,138,349.
Patented May 4, 1915.
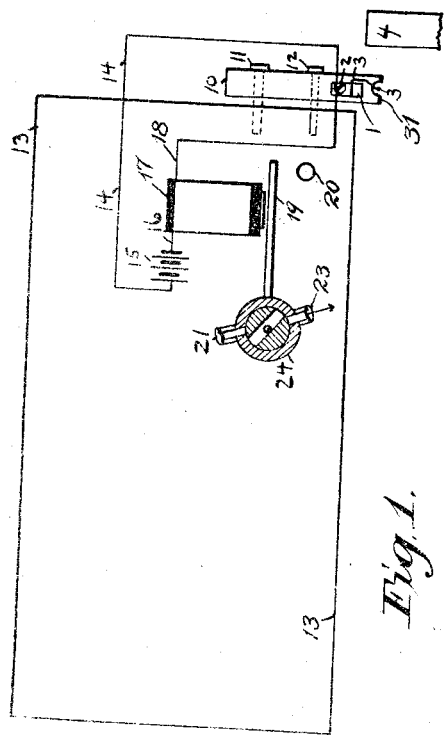
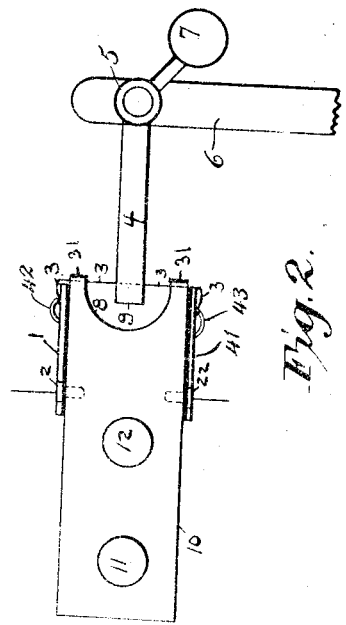
Fig. 1.
Fig. 2.
Witnesses
Inventor
A. L. Bower.

UNITED STATES PATENT OFFICE.

ABRAM L. BOWER, OF BOYERTOWN, PENNSYLVANIA.

AUTOMATIC TRAIN-CONTROLLING DEVICE.

1,138,349.  Specification of Letters Patent.  Patented May 4, 1915.

Application filed March 17, 1914. Serial No. 825,336.

*To all whom it may concern:*

Be it known that I, ABRAM L. BOWER, a citizen of the United States of America, and a resident of Boyertown, in the county of Berks and State of Pennsylvania, have invented a new and useful Improvement in Automatic Train-Controlling Devices, of which the following is a specification.

This invention has for its object a simple and efficient construction for operating a brake valve automatically when an engineer runs past a semaphore arm at danger.

The drawings accompanying this specification show detailed views of the devices used.

Figure 1 shows the electric circuit and brake valve employed and Fig. 2 shows the semaphore or equivalent arm and the side view of the yoke used.

A strong oaken plank or board 10 is bolted to the front of the engine cab frame 13 and its upper edge extends above the roof of the cab and its outer end is cut out in the center. This end of the plank looks like a yoke. The points 31 extend outward a short distance beyond the edge of the roof of the cab. The points 31 are grooved vertically. The semaphore blade 4 passes between the points 31 of the yoke when in the danger or stop position. At other times the blade is up (or down) at an angle of ninety or forty-five degrees so that it does not approach so closely to the cab as in the stop position.

A brake valve 24 is controlled by a relay armature 19 of magnet 17 in such a manner that the deënergization of the magnet applies the brakes. A battery 15 is connected to the magnet by wire 16 and to a brass plate 1 screwed to the top of the edge of the plank. Wire 18 connects the magnet to another plate 41 screwed to the bottom edge of the plank. A spring clamp connector 42 is attached to the brass plate 1 to receive a thin wire 3 under it. Another spring clamp connector 43 is attached to brass plate 41 in the same manner to receive the other end of wire 3 under it. Wire 3 is stretched taut vertically in the grooves 31 in the path of the semaphore blade in stop position. The circuit to the magnet is as follows, from battery 15 to wire 14, brass plate 1, spring clamp 42, wire 3, spring clamp 43, brass plate 41, wire 18, magnet 17 and wire 16 to the battery.

The operation of the device is as follows:—The engineer is supposed to be sleeping at his post. The semaphore blade is at stop position and it strikes the thin wire 3 and tears it off. Magnet 17 is deënergized and the brakes go on bringing the train to a standstill. The engineer wakes up and secures another piece of thin wire and clamps it in the same position as before, then releases his brakes and goes on cautiously. Or, preferably, he backs out of the block and waits until the semaphore goes to proceed position. He then proceeds.

Various modifications may be made in this device. A contact spring may be included in the circuit of the magnet instead of the thin wire 3 and be so adapted as to be struck by the semaphore blade, thus breaking the circuit.

I claim—

1. The herein described combination of a semaphore blade on the roadway, a fragile conductor mounted to engage said blade, a train circuit containing a source of electric current, a magnet and the fragile conductor.

2. An engaging arm located along the trackway, a circuit on the train, said circuit including a fragile conductor and a magnet, a brake valve controlled by the magnet, said fragile conductor being adapted to engage said arm when the latter is in stop position.

3. An engaging arm on the trackway, a train controlling device, a train circuit operating the train controlling device, a fragile conductor in the circuit adapted to engage said arm.

4. An engaging arm on the trackway, a train controlling device, a train circuit operating the train controlling device, a fragile conductor in the circuit, said conductor being adapted to engage said arm, said arm having two positions, an engaging position assumed by gravity and a non-engaging position.

In witness whereof I have signed this specification in the presence of two subscribing witnesses, this sixteenth day of March, 1914.

ABRAM L. BOWER.

Witnesses:
 LEWIS P. G. FEGLEY,
 MARY B. FREED.